(12) United States Patent
Chuang et al.

(10) Patent No.: US 6,744,631 B1
(45) Date of Patent: Jun. 1, 2004

(54) HEAT DISSIPATING DEVICE

(75) Inventors: Wei-Pin Chuang, Taipei (TW);
Chih-Chuan Cheng, Taipei (TW)

(73) Assignee: Compal Electronics, Inc. (TW)

( * ) Notice: Subject to any disclaimer, the term of this patent is extended or adjusted under 35 U.S.C. 154(b) by 0 days.

(21) Appl. No.: 10/331,487

(22) Filed: Dec. 31, 2002

(30) Foreign Application Priority Data

Nov. 15, 2002 (TW) ........................................ 91218426 U

(51) Int. Cl.$^7$ .............................. G06F 1/16; H05K 7/20
(52) U.S. Cl. ...................... 361/687; 361/695; 361/697; 165/80.3; 454/184
(58) Field of Search .................... 361/687, 692–697, 361/702–704, 707–710, 715, 719, 722, 730, 752, 690; 415/175–178, 204–206, 213.1, 214.1, 211.1; 165/122, 126, 104.33, 185, 80.3, 80.4, 80.2, 121; 454/184; 62/259.2; 310/67 R, 90, 91, 62, 63, 257, 9, 42, 915.6; 417/313, 360, 572, 83, 78, 423.13, 423.7, 354, 423.12, 12–15

(56) References Cited

U.S. PATENT DOCUMENTS

| | | | | |
|---|---|---|---|---|
| 5,694,294 A | * | 12/1997 | Ohashi et al. | 361/687 |
| 6,111,748 A | * | 8/2000 | Bhatia | 361/695 |
| 6,132,170 A | * | 10/2000 | Horng | 415/178 |
| 6,141,214 A | * | 10/2000 | Ahn | 361/687 |
| 6,348,748 B1 | * | 2/2002 | Yamamoto | 310/62 |
| 2003/0161102 A1 | * | 8/2003 | Lee et al. | 361/687 |
| 2003/0223864 A1 | * | 12/2003 | Horng et al. | 415/203 |

* cited by examiner

*Primary Examiner*—Michael Datskovsky
(74) *Attorney, Agent, or Firm*—Bacon & Thomas, PLLC

(57) ABSTRACT

A heat dissipating device includes a housing and a fan unit. The housing has a top wall, a bottom wall opposite to the top wall, and a lateral wall that interconnects the top and bottom walls. Each of the top, bottom and lateral walls is formed with at least one vent hole therethrough. The fan unit is mounted in the housing for circulating air within the housing. The fan unit is operable so as to allow cool air to flow into and heated air to flow out of the housing through the vent holes in the top, bottom and lateral walls.

8 Claims, 4 Drawing Sheets

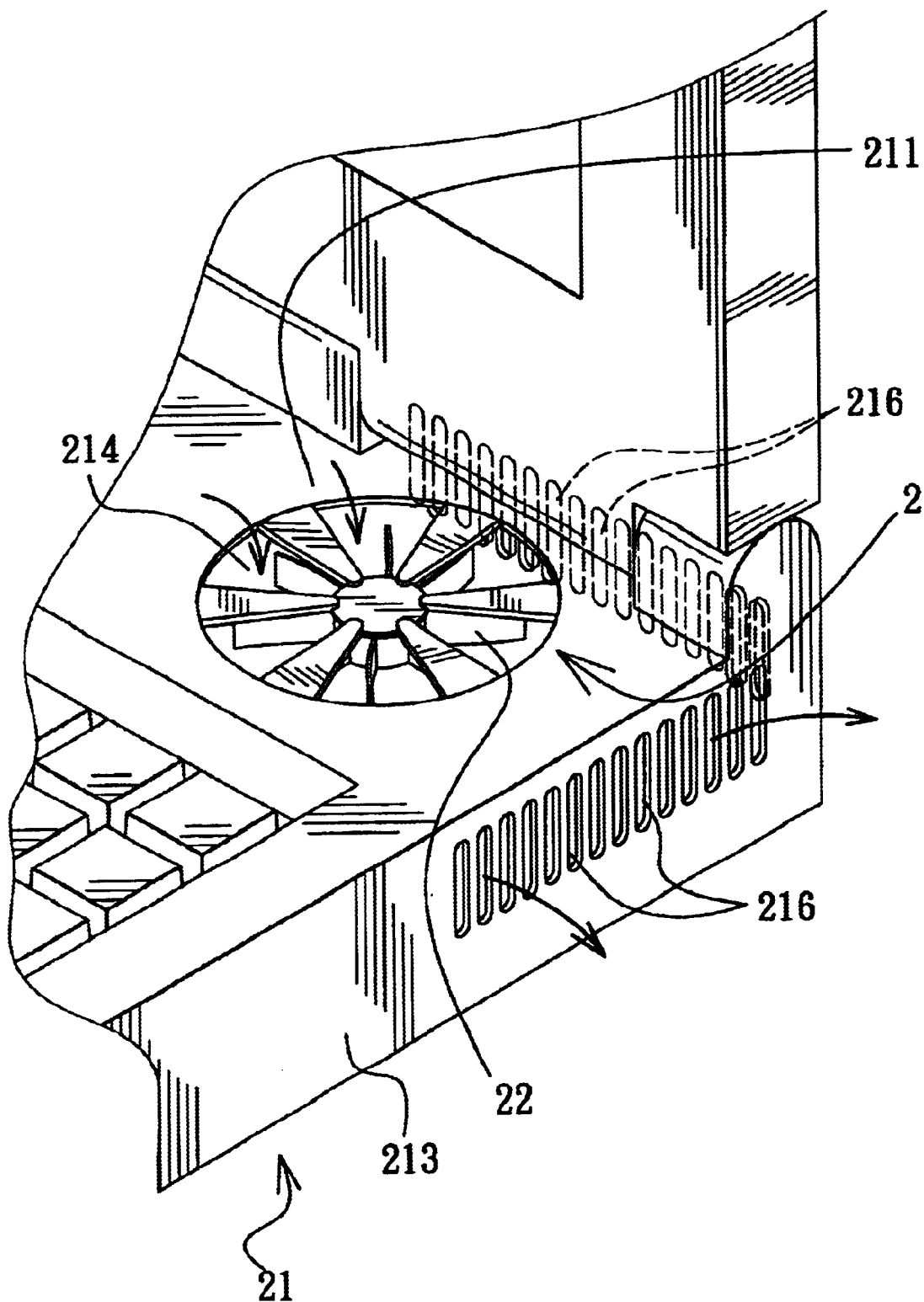
F I G. 3

HEAT DISSIPATING DEVICE

CROSS-REFERENCE TO RELATED APPLICATION

This application claims priority of Taiwanese application No. 091218426, filed on Nov. 15, 2002.

BACKGROUND OF THE INVENTION

1. Field of the Invention

The invention relates to a heat dissipating device, more particularly to a heat dissipating device of an electronic device.

2. Description of the Related Art

As technology advances in the field of portable computers, performance of the portable computer has become more and more powerful and processing speeds are also on the rise. Under such high speed operation, considerable heat is generated by electronic components, such as a central processing unit (CPU), of the portable computer. Thus, heat dissipation is a major concern of portable computer manufacturers.

As shown in FIG. 1, a conventional portable computer 1 includes a housing 11 and a heat dissipating device. The housing 11 includes a lateral wall 111 that is formed with vent holes 112 therethrough. The heat dissipating device includes a fan unit 12 that is mounted in the housing 11 for circulating air within the housing 11, and that is operable so as to allow cool air to flow into and heated air to flow out of the housing 11 through the vent holes 112 in the lateral wall 111. When the fan unit 12 operates, the heated air attributed to a CPU (not shown) and other electronic components (not shown) disposed in the housing 11 is expelled out of the housing 11 through the vent hole 112 in the lateral wall 111. However, since the heated air is not expelled out of the housing 11 quite fast enough, part of the heated air remains in the housing 11, thereby resulting in a poor heat-dissipating efficiency.

SUMMARY OF THE INVENTION

Therefore, the object of the present invention is to provide a heat dissipating device that can overcome the aforesaid drawback associated with the prior art.

According to the present invention, a heat dissipating device comprises a housing and a fan unit. The housing has a top wall, a bottom wall opposite to the top wall and a lateral wall that interconnects the top and bottom walls. Each of the top, bottom and lateral walls is formed with at least one vent hole therethrough. The fan unit is mounted in the housing for circulating air within the housing. The fan unit is operable so as to allow cool air to flow into and heated air to flow out of the housing through the vent holes in the top, bottom and lateral walls.

BRIEF DESCRIPTION OF THE DRAWINGS

Other features and advantages of the present invention will become apparent in the following detailed description of the preferred embodiment with reference to the accompanying drawings, of which:

FIG. 3 is a fragmentary perspective view of the preferred embodiment; and

DETAILED DESCRIPTION OF THE PREFERRED EMBODIMENT

Figure 1:
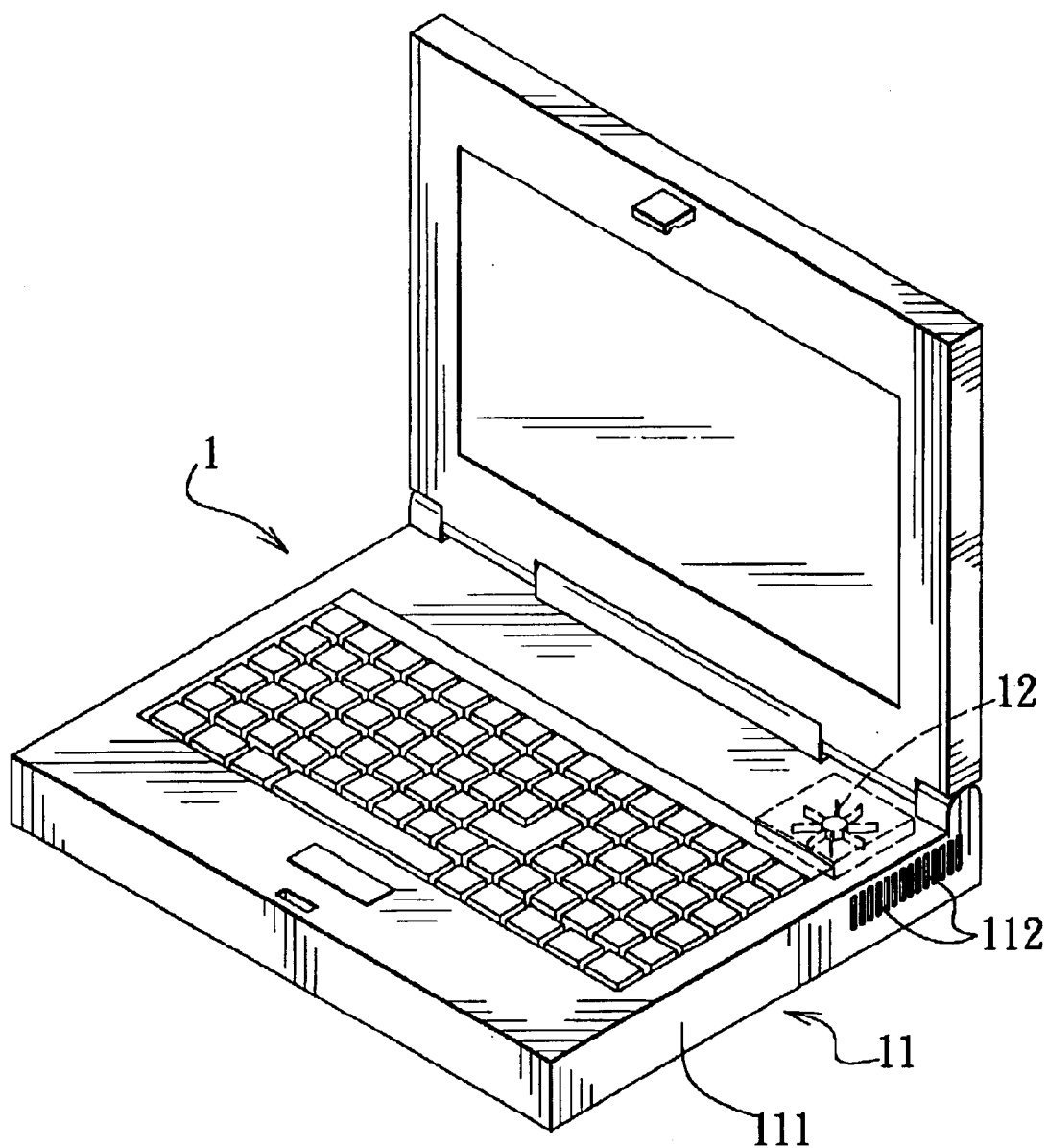
FIG. 1 is a perspective view showing a conventional heat dissipating device of an electronic device.
Figure 2:
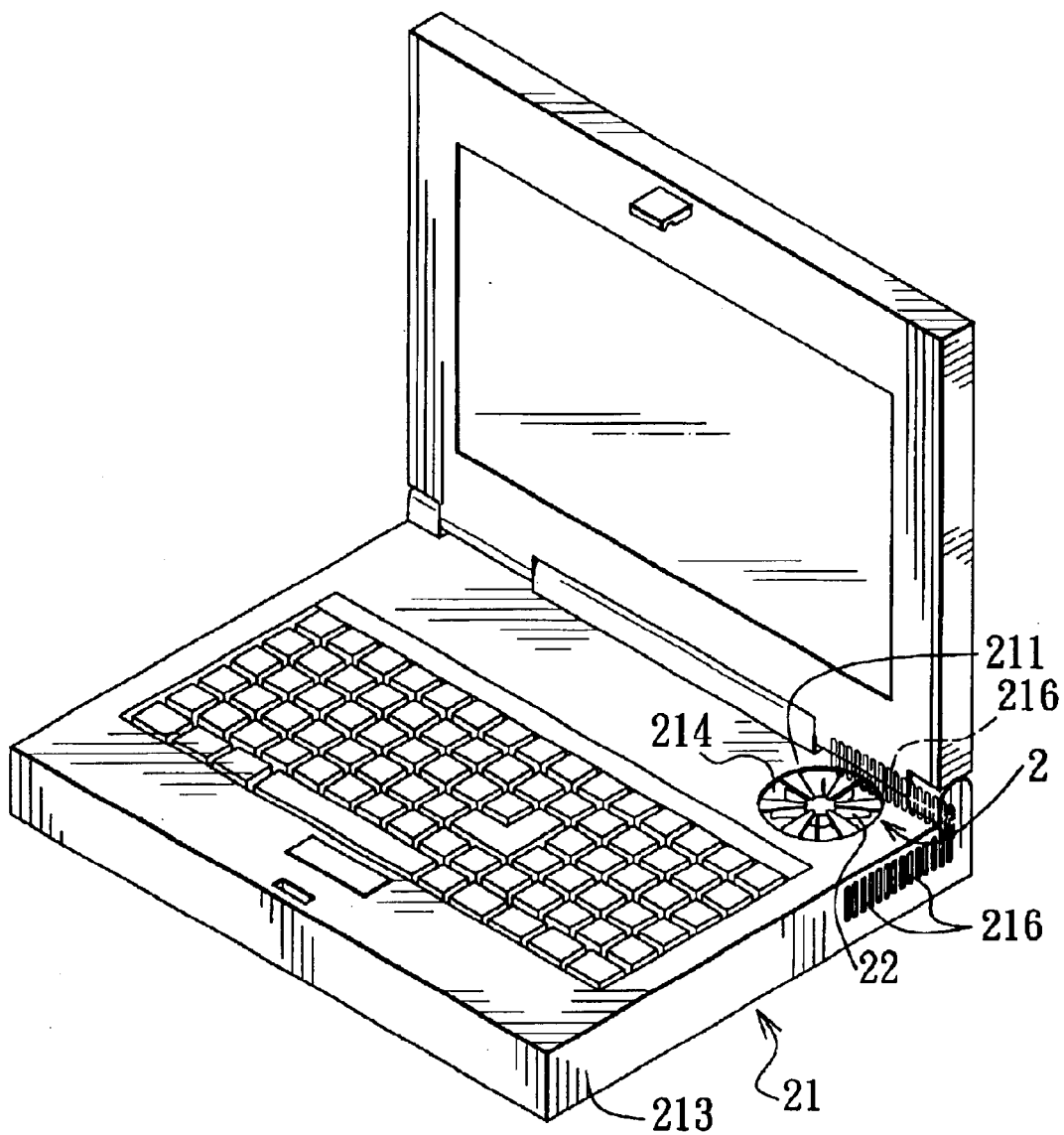
FIG. 2 is a perspective view of the preferred embodiment of a heat dissipating device according to the present invention that is implemented in an electronic device.
Figure 4:
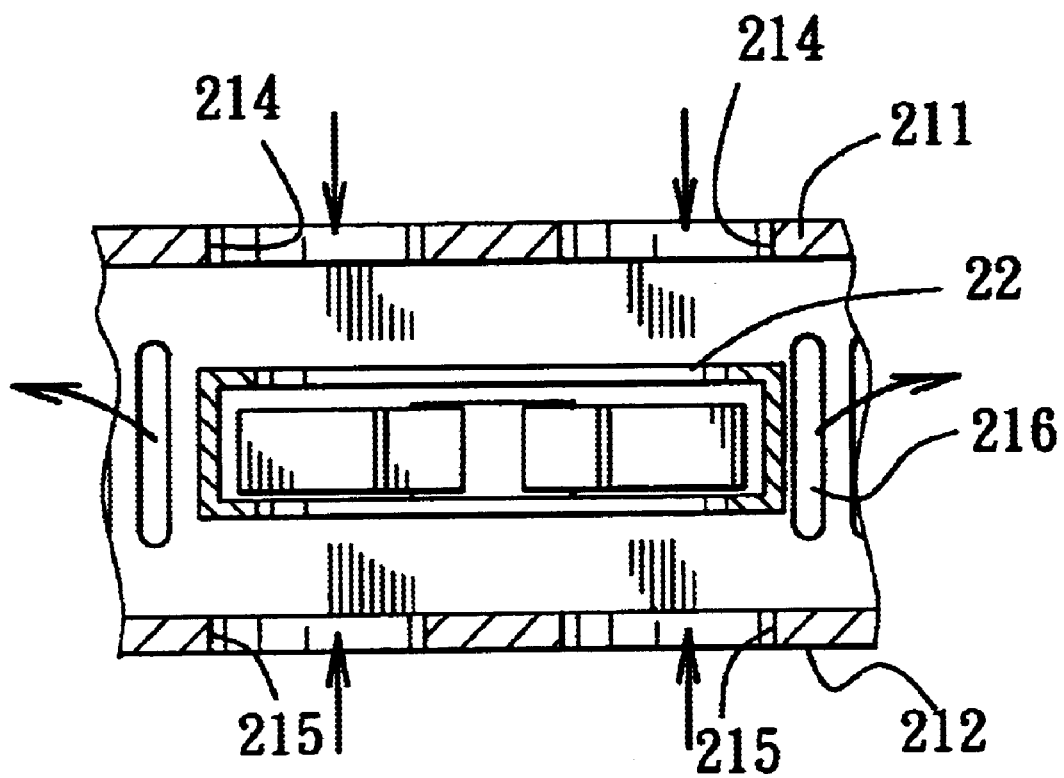
FIG. 4 is a fragmentary sectional view of the preferred embodiment.

Referring to FIGS. 2 to 4, the preferred embodiment of the heat dissipating device 2 according to the present invention is implemented in an electronic device (e.g. a portable computer) and includes a housing 21 and a fan unit 22. A keyboard of the electronic device is mounted on the housing 21. The housing 21 has a top wall 211, a bottom wall 212 opposite to the top wall 211, and a lateral wall 213 that interconnects the top and bottom walls 211, 212. Each of the top, bottom and lateral walls 211, 212, 213 is formed with at least one vent hole 214, 215, 216 therethrough. The fan unit 22 is mounted in the housing 21 for circulating air within the housing 21, and is operable so as to allow cool air to flow into and heated air to flow out of the housing 21 through the vent holes 216 in the top, bottom and lateral walls 211, 212, 213.

In the preferred embodiment, the fan unit 22 is operable so as to draw the cool air into the housing 21 through the vent holes 214, 215 in the top and bottom walls 211, 212 for cooling electronic components (now shown), such as a central processing unit (CPU), disposed in the housing 21, and so as to expel the heated air through the vent holes 216 in the lateral wall 213. Therefore, heat generated by the electronic components can be dissipated accordingly. As shown in FIGS. 3 and 4, the fan unit 22 is preferably a centrifugal fan. The arrows shown in FIGS. 3 and 4 indicate the preferred direction of air flow.

It has thus been shown that the heat dissipating device 2 of this invention is implemented in an electronic device that includes a housing 21 having top, bottom and lateral walls 211, 212, 213 formed with vent holes 214, 215, 216, and a fan unit 22 mounted in the housing 21. The arrangement as such allows the fan unit 22 to draw cool air into the housing 21 through the vent holes 214, 215 in the top and bottom walls 211, 212, and to expel the heated air through the vent holes 216 in the lateral wall 213. The object of the present invention to rapidly and effectively dissipate heat in the housing 21 of the electronic device is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A heat dissipating device comprising:

a housing having a top wall, a bottom wall opposite to said top wall, and a lateral wall that interconnects said top and bottom walls, each of said top, bottom and lateral walls each comprising at least one vent hole therethrough; and a fan unit mounted in said housing for circulating air within said housing, said fan unit being operable so as to allow cool air to flow into said housing and heated air to flow out of said housing through said vent holes in said top, bottom and lateral walls.

2. The heat dissipating device as claimed in claim 1, wherein said fan unit draws the cool air into said housing through said vent holes in said top and bottom walls.

3. The heat dissipating device as claimed in claim 1, wherein said fan unit expels the heated air through said at least one vent hole in said lateral wall.

4. An electronic device comprising:

a housing having a top wall, a bottom wall opposite to said top wall, and a lateral wall that interconnects said top and bottom walls, each of said top, bottom and lateral walls each comprising at least one vent hole therethrough;

a fan unit mounted in said housing for circulating air within said housing, said fan unit being operable so as to allow cool air to flow into said housing and heated air to flow out of said housing through said vent holes in said top, bottom and lateral walls; and a keyboard mounted on said housing.

5. The electronic device as claimed in claim 4 wherein said fan unit draws the cool air into said housing through said vent holes in said top and bottom walls.

6. The electronic device as claimed in claim 4, wherein said fan unit expels the heated air through said at least one vent hole in said lateral wall.

7. The electronic device as claimed in claim 1, wherein the fan unit comprises a centrifugal fan.

8. The electronic device as claimed in claim 4, wherein the fan unit comprises a centrifugal fan.

* * * * *